US011928931B2

(12) United States Patent
Coppola et al.

(10) Patent No.: US 11,928,931 B2
(45) Date of Patent: Mar. 12, 2024

(54) SYSTEMS AND METHODS FOR STORING, SHARING, AND REPLAYING A GAME EVENT

(71) Applicant: Aristocrat Technologies, Inc., Las Vegas, NV (US)

(72) Inventors: Roberto Coppola, Las Vegas, NV (US); Frank Rodriguez, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 214 days.

(21) Appl. No.: 16/913,780

(22) Filed: Jun. 26, 2020

(65) Prior Publication Data

US 2021/0027580 A1 Jan. 28, 2021

Related U.S. Application Data

(60) Provisional application No. 62/877,656, filed on Jul. 23, 2019.

(51) Int. Cl.
*G07F 17/32* (2006.01)
*G07F 17/34* (2006.01)

(52) U.S. Cl.
CPC ...... *G07F 17/3262* (2013.01); *G07F 17/3213* (2013.01); *G07F 17/34* (2013.01)

(58) Field of Classification Search
CPC ......................... G07F 17/3239; G07F 17/3206
See application file for complete search history.

(56) References Cited

U.S. PATENT DOCUMENTS 7,112,134 B1 * 9/2006 Erlichman .......... G07F 17/3255 463/16
8,827,813 B2 9/2014 Lemay
8,956,211 B2 2/2015 Johnson
9,011,236 B2 4/2015 Nelson
9,066,122 B1 * 6/2015 Rattazzi ........... H04N 21/44204
9,147,313 B2 9/2015 Nelson
9,311,769 B2 4/2016 Lemay
2002/0128057 A1 * 9/2002 Walker ............... G06Q 30/0217 463/20
2002/0196342 A1 * 12/2002 Walker ..................... H04N 7/18 348/157
2003/0083132 A1 * 5/2003 Berg ................... G07F 17/3206 463/40
2003/0195043 A1 * 10/2003 Shinners ............. G07F 17/3276 463/42

(Continued)

*Primary Examiner* — Dmitry Suhol
*Assistant Examiner* — Jason Pinheiro
(74) *Attorney, Agent, or Firm* — Armstrong Teasdale LLP

(57) ABSTRACT

A system for playing a wagering game is described. The system includes a display device, a memory device, and a processor configured to execute instructions stored in the memory device, which when executed, cause the processor to at least: provide the wagering game on the display device; determine whether a game event has occurred during the wagering game; store a copy of the game event in the memory device in response to determining that the game event has occurred; generate digital content in response to determining that the game event has occurred; overlay the digital content on the copy of the game event; and provide access to the copy of the game event with the digital content overlaid thereon to at least one replay recipient.

20 Claims, 10 Drawing Sheets

(56) References Cited

U.S. PATENT DOCUMENTS

| | | | | | |
|---|---|---|---|---|---|
| 2004/0147314 | A1* | 7/2004 | LeMay | G07F 17/32 | 463/30 |
| 2004/0192444 | A1* | 9/2004 | Morrison | G07F 17/3216 | 463/46 |
| 2008/0002961 | A1* | 1/2008 | Sundstrom | G03B 13/30 | 396/133 |
| 2008/0274798 | A1* | 11/2008 | Walker | G07F 17/3237 | 463/43 |
| 2011/0111862 | A1* | 5/2011 | Allen | G07F 17/32 | 463/43 |
| 2014/0203071 | A1* | 7/2014 | Eggert | G06F 16/958 | 235/375 |
| 2014/0342795 | A1* | 11/2014 | Zalcman | G07F 17/3206 | 463/17 |
| 2015/0379808 | A1* | 12/2015 | Rosenblatt | G07F 17/3227 | 463/20 |
| 2020/0043277 | A1* | 2/2020 | Danielson | G07F 17/3255 | |
| 2020/0105088 | A1* | 4/2020 | Nelson | G07F 17/326 | |
| 2020/0273284 | A1* | 8/2020 | Nelson | G07F 17/3225 | |

* cited by examiner

SYSTEMS AND METHODS FOR STORING, SHARING, AND REPLAYING A GAME EVENT

CROSS REFERENCE TO RELATED APPLICATIONS

The present application claims the benefit of and priority to U.S. Provisional Patent Application No. 62/877,656, filed Jul. 23, 2019, and entitled "SYSTEMS AND METHODS FOR STORING, SHARING, AND REPLAYING A GAME EVENT," the disclosure of which is hereby incorporated by reference in its entirety.

TECHNICAL FIELD

The field of disclosure relates generally to electronic gaming, and more particularly to systems and methods storing, sharing, and/or replaying a game event, such as a winning game outcome.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Many conventional EGMs do not afford players an opportunity to store or share their wins with others. For example, many EGMs provide a celebration graphic or celebration animation in conjunction with certain winning game outcomes. However, there is traditionally no option to store the celebration experience for enjoyment later by the winning player, nor has there been any facility for sharing winning game experiences with family members and friends of the winning player.

BRIEF DESCRIPTION

In one aspect, an electronic gaming system is described. The system includes a display device, a memory device, and a processor configured to execute instructions stored in the memory device, which when executed, cause the processor to at least: provide the wagering game on the display device; determine whether a game event has occurred during the wagering game; store a copy of the game event in the memory device in response to determining that the game event has occurred; generate digital content in response to determining that the game event has occurred; overlay the digital content on the copy of the game event; and provide access to the copy of the game event with the digital content overlaid thereon to at least one replay recipient.

BRIEF DESCRIPTION OF THE DRAWINGS

An example embodiment of the subject matter disclosed will now be described with reference to the accompanying drawings.

DETAILED DESCRIPTION

Embodiments of the present disclosure provide systems and methods for storing one or more game events, such as, for example, winning game outcomes, and providing the stored game events to one or more replay recipients, including the original player, for replay of the stored game events. In one example, a player may achieve a winning game outcome on a reel game, whereupon the winning game outcome may be stored for replay or subsequent watching as a game event (including a variety of associated data, such as digital content). The player may also designate or select one or more replay recipients (e.g., family members, social media contacts, etc.), who may receive a copy of (or a link to) the stored game event for replay on their electronic gaming machines, computing devices, smartphones, and the like. Stored game events may, in addition, be provided to one or more recipients in association with the digital content, such as a border that frames a replay video copy of the game event and that identifies the casino that provided the winning game outcome.

Figure 1:
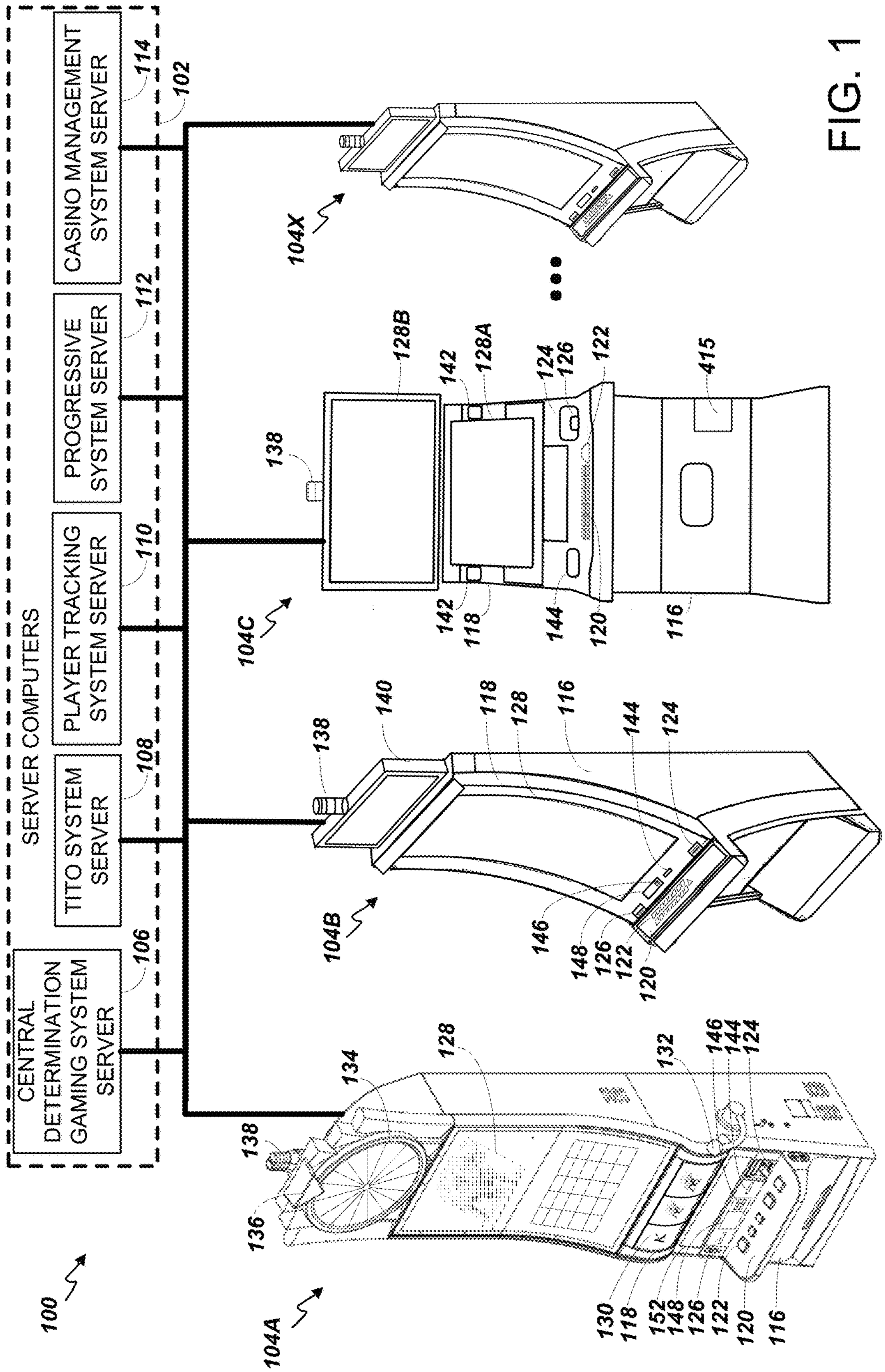
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
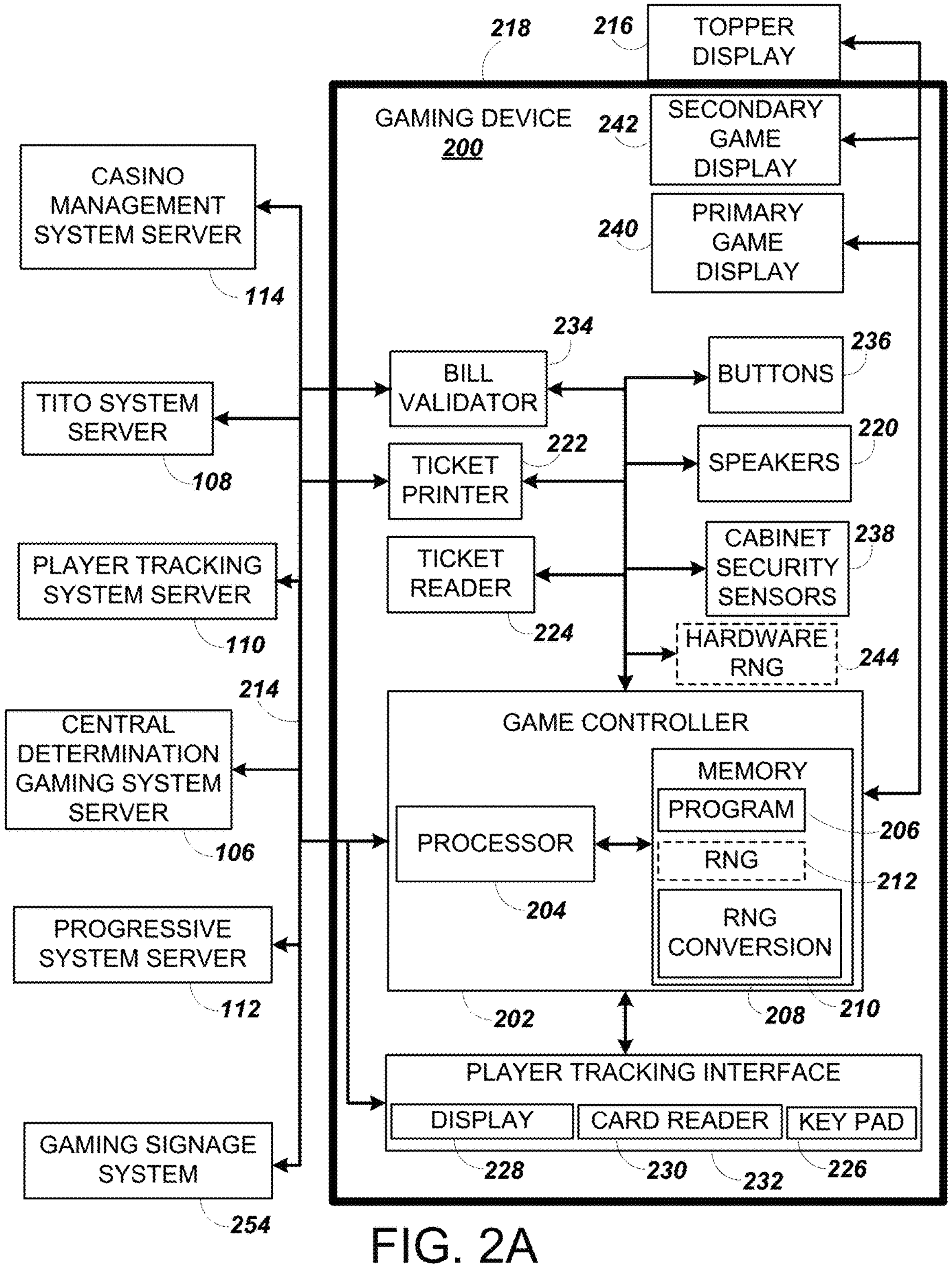
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
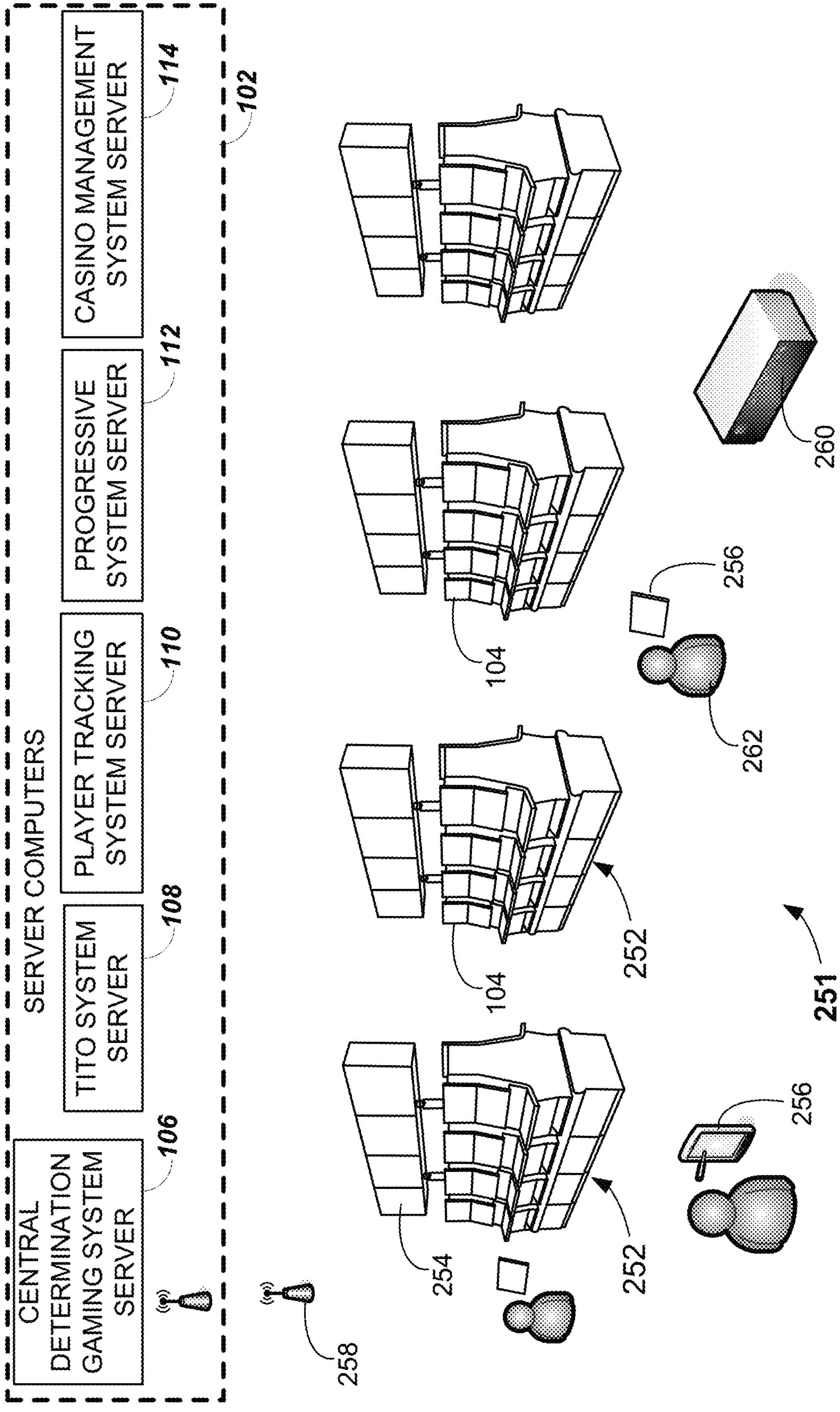
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
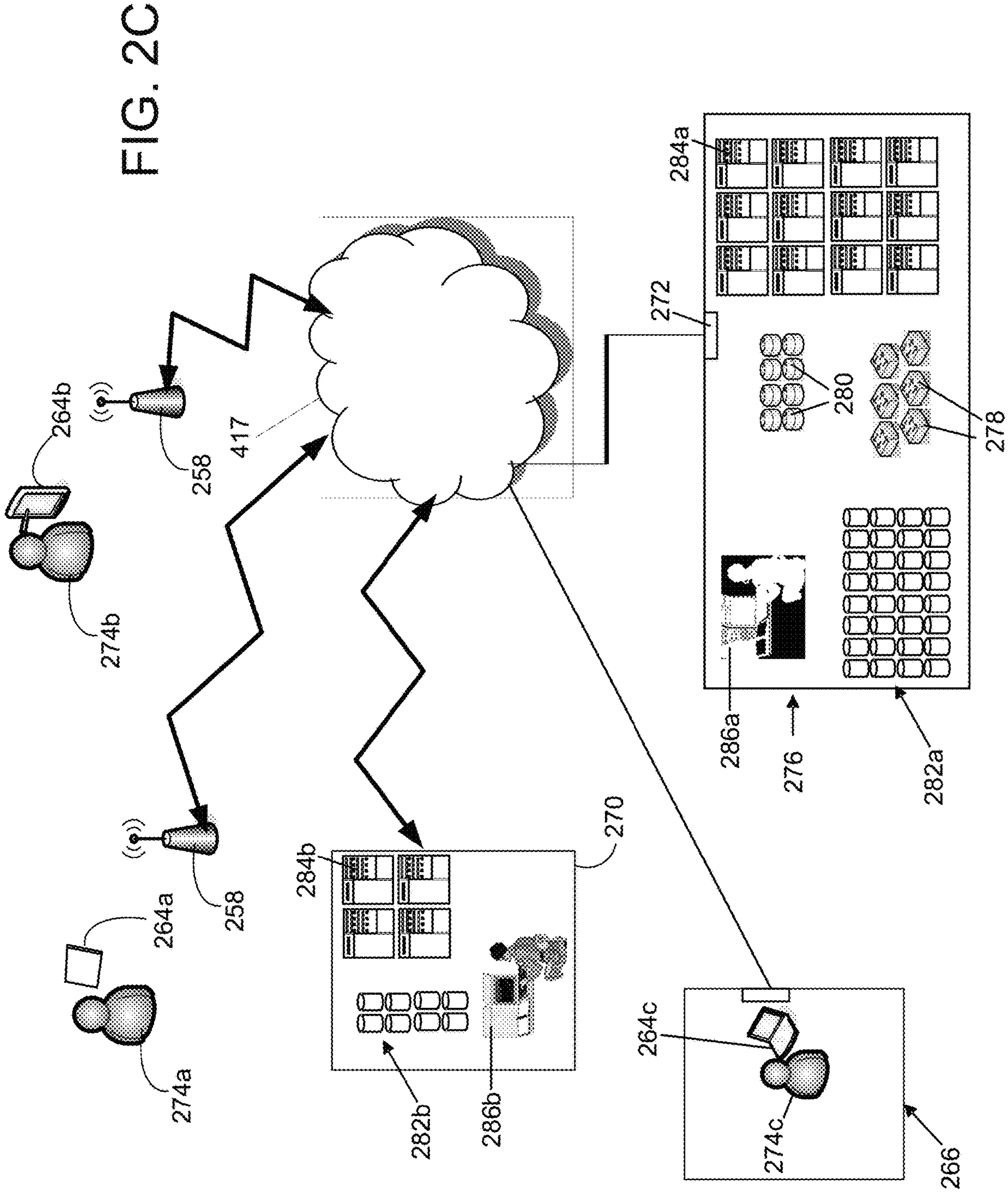
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end-user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer (e.g., a personal computer) that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server

284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
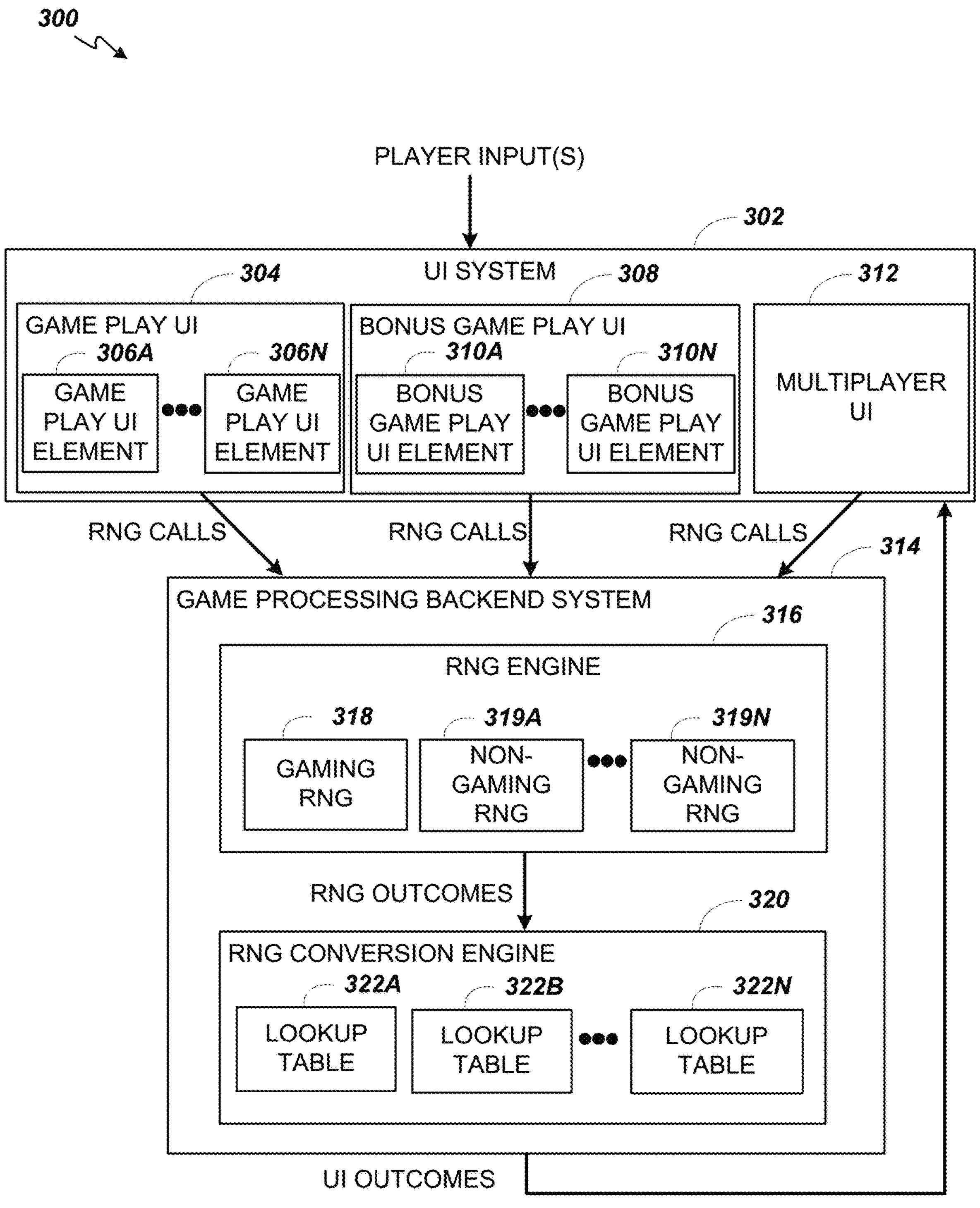
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
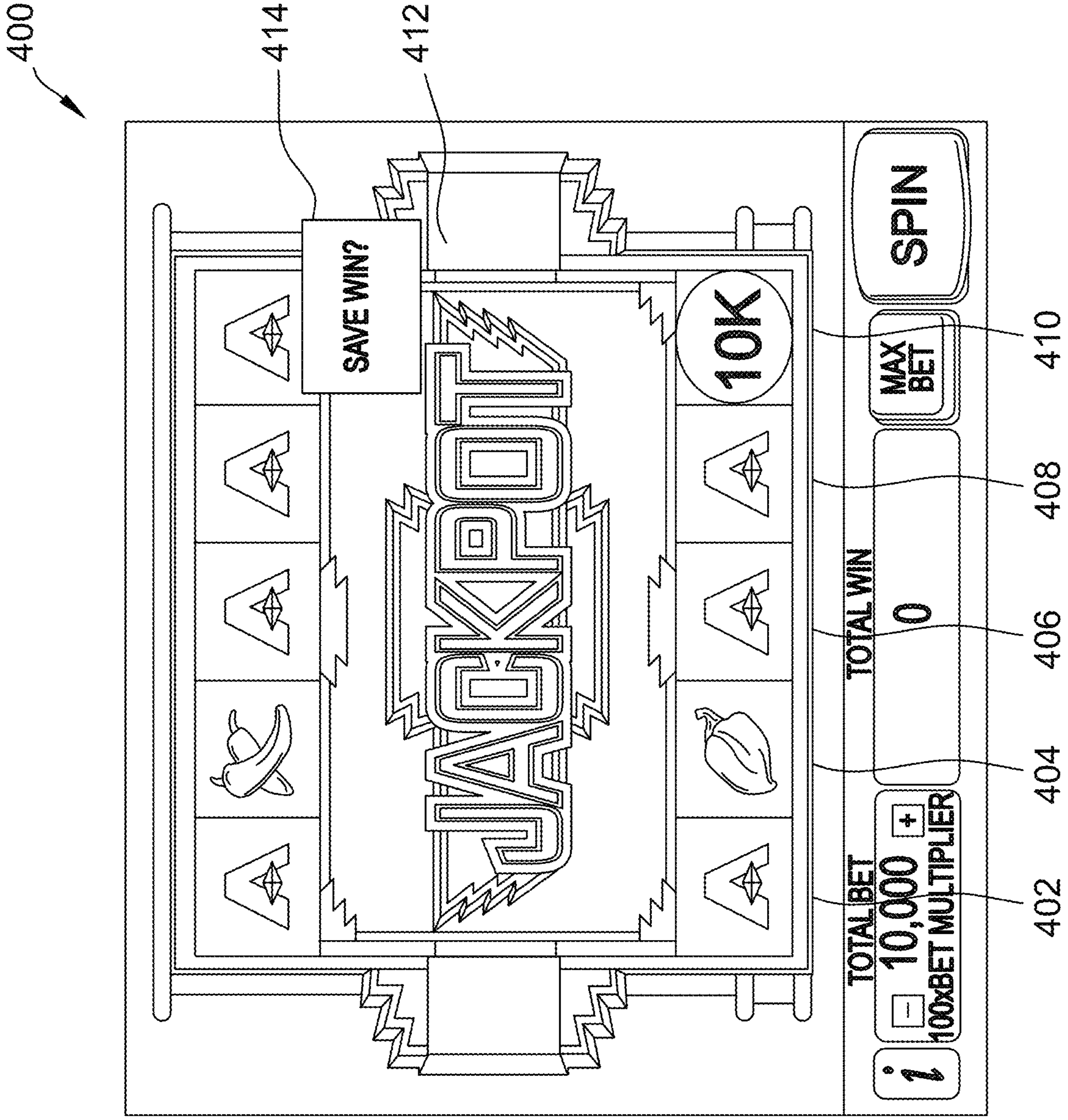
FIG. 4 is a screenshot of a wagering game, in which a game event has occurred, and in which an option to save the game event for replay is provided to a player of the wagering game.

FIG. 4 is a screenshot of an electronic wagering game 400, in which a game event has occurred, and in which an option to save the game event, in some embodiments with digital content overlaid thereon, is provided to a player of the wagering game 400. In some embodiments, game events may be saved for a variety of reasons, as described herein, such as for example, for storage and/or replay of the game event later. In various embodiments, the operations for storage and sharing of game events may be performed, all or in part, by any suitable computer processor, such as game controller 202 (or processor 204 thereof), and/or any other processor or controller of an EGM 104A-104X, as desired. Likewise, in at least some embodiments, the operations described herein may be performed by any server and/or any EUD 264 (e.g., any smartphone or tablet computing device), any gaming data center 276, and/or any other computing device, as described herein.

In the example embodiment, wagering game 400 includes a plurality of reels, such as a first reel 402, a second reel 404, a third reel 406, a fourth reel 408, and a fifth reel 410. Reels 402-410 may include simulated or "virtual" reels generated and displayed by game controller 202 (or processor 204 thereof) on primary game display 240 and/or secondary game display 242. In an online embodiment, reels 402-410 may also be displayed on a display device of a player's EUD 264. In the exemplary embodiment, reels 402-410 are displayed on primary game display 240. In other embodiments, reels 402-410 may include one or more physical or mechanical reels having a display element, such as a liquid crystal display (LCD), capable of displaying one or more symbols during gameplay. In other embodiments, reels 402-410 may include a plurality of mechanical reels overlaid by an LCD panel.

Each reel 402-410 may include a plurality of symbols, and symbols from each reel 402-410 may be displayed in one of a plurality of symbol positions, which may, together, define a matrix of symbol positions. Each symbol position may be designated by a row number (e.g., "1," "2," "3," "4," "5," etc.) and a column letter (e.g., "A," "B," "C," "D," "E," etc.) For example, the upper-left-most symbol position, occurring on reel 402 at the intersection of row 1 and column A, may be designated by the symbol position "1A."

Accordingly, during gameplay, one or more reels 402-410 may be spun virtually and stopped to display a subset of the symbols of one or more reels 402-410. In at least some embodiments, one or more reels 402-410 may be spun and stopped in response to credit wager placed by a player (e.g., which a player may place by selecting a "Spin" button).

In at least some embodiments, five symbol positions of one or more reels 402-410 may be selected, stopped, and displayed by game controller 202 for presentation to a player. In addition, in at least some embodiments, one or more consecutive symbols are selected for presentation. For example, if a symbol at symbol position "1A" is selected by game controller 202 for presentation, the symbols at symbol positions "2A," "3A," "4A," and "5A" may also be selected and displayed.

In other embodiments, wagering game 400 may not be a reel game or may include reels 402-410 in addition to one or more other wagering or gameplay aspects. For example, in at least one embodiment, wagering game 400 may be a bingo game (e.g., a Class II bingo game) and/or a lottery-style game (e.g., a Class I lottery-style game, such as a keno game). In other embodiments, wagering game 400 may be a video game, such as an online multiplayer video game and/or a so-called massively multiplayer online game (MMO). In the instance that wagering game 400 is an online multiplayer game (or an MMO), wagering game 400 may, in at least some embodiments, also include one or more wagering aspects, which may distinguish wagering game 400 from traditional MMOs.

Accordingly, a variety of wagering games 400 may be provided. In each type of wagering game 400, however, one or more game events may occur, where game events may include (as described above) anything that may happen during wagering game 400. To illustrate, game events may include combinations of symbols displayed on reels 402-410, including winning and non-winning combinations, sequences or video clips of game play, and the like. In one example, non-winning outcomes may be recorded as game events, particularly where such non-winning combinations are "almost-winning," such as, for example, a combination of symbols that is only one or two symbols different from a winning combination or a jackpot combination. As a result, it will be appreciated that game events may vary from one wagering game 400 to another. For example, game events that occur during a reel game may differ from game events that occur during an MMO.

In the example of FIG. 4, a game event embodied as a winning symbol combination on reels 402-410 (associated with an accompanying game award) may be seen to have occurred. The game event is accompanied, as described herein, by a celebration graphic 412. Although the illustrative embodiment shows celebration graphic 412, it will be appreciated that many types of game events (e.g., including non-jackpot game events, various other winning game events, non-winning game events, and almost-winning game events, as described above) may also trigger the storage and replay features described herein.

Accordingly, in this example, celebration graphic 412 is superimposed over reels 402-410 and indicates that the player has won a "JACKPOT." Again, it will be appreciated that a variety of other game events may occur as well, and that any suitable celebration graphic 412 (or no celebration graphic) may accompany each game event. For example, a more general celebration graphic 412 may simply indicate that the player is a "WINNER." Likewise, a celebration graphic, such as "ALMOST!" may accompany an almost-winning game event, and the like.

In response to the occurrence of the game event, game controller 202 may store the game event, or an image copy of the game event, in a computer memory device, such as memory 208, and/or any other suitable memory. As used herein, an "image copy" or "copy" of the game event may include any screenshot or other image showing the game event itself and/or a sequence of images showing, for example, anything leading up to and/or following the game event. For example, in a reel game an image copy of a game event may include a winning symbol combination or a screenshot of the winning combination or a video copy of one or more reel spins leading up to and including the winning outcome and/or celebration graphics provided in association with the winning outcome.

However, for convenience, game events are described as being stored herein. It will be understood, however, that storage of game events refers to storage of an image copy of the events, including, but not limited to, storage of winning symbol combinations, winning outcomes in the form of screenshots, video copies of winning gameplay, and other winning, non-winning, and almost-winning game outcomes, as described herein. In some embodiments, game controller 202 may upload the game event to a backend server system, such as any of servers 106-114, for storage and retrieval.

Specifically, in at least some embodiments, game controller 202 may execute instructions causing a display device (e.g., of an EGM 104A-104X) to display a player selectable option, such as storage option 414, to store the game event may be provided to the player, and the player may select the storage option 414 to cause game controller 202 to store the game event, as described. In other embodiments, no storage option 414 may be needed. For example, in at least some embodiments, a player's loyalty or membership account may store information about whether a player is enrolled or participating in a program that allows the player to store and replay game events, as described herein. In some embodiments, game controller 202 may cause display of a player selectable option to be presented to the player to cause game controller 202 to automatically upload the game event to, for example, a social media page for the player, the casino, the EGM manufacturer, or any variety of social media pages.

In these embodiments, if a player achieves a winning game event, a non-winning game event, an almost-winning game event, and or any other game event specified by the player and/or a casino operator, the game event may be automatically recorded and stored on a suitable memory device (e.g., a server memory, an EGM memory, a memory of the player's EUD 264, and the like). Further, in various embodiments, a player may specify which game events, or which type(s) of game event(s), that will be recorded.

For example, a player may login to a loyalty account to select recording and/or replay options. In one embodiment, a player may select from recording all winning game events, only winning game events having a payout greater than a player specified game event threshold value (e.g., greater than 500 credits), non-winning events, almost-winning outcomes (e.g., a game outcome within a predefined difference from a winning outcome), and the like. A player may also control a variety of other recording and replay options from his or her player account, such as a default contact list that will be provided a link to watch a recorded game event. A player may also specify whether a front-facing camera of the player's device (e.g., the EGM 104A-104X and/or the player's EUD 264) should record the photograph and/or video of the player's reaction to the game event, while the game event is occurring in real-time and being recorded. It will be appreciated that a variety of other parameters and settings may be manipulated in the player's loyalty account as well and that the examples given herein are for illustrative purposes.

In embodiments that include storage option 414, the option may be displayed (e.g., as a graphical user interface or GUI) over reels 402-410, over celebration graphic 412, and/or in any other suitable location. To enable selection of storage option 414, primary game display 240 and/or secondary game display 242 may include a touchscreen or touch sensitive display, which may enable a player to touch or tap option 414 for selection. Likewise, in an online gaming embodiment, a player may utilize a touchscreen of EUD 264 to select a storage option 414. In addition, in some embodiments, a player may select storage option 414 using a mechanical pushbutton of button deck 120. In some other embodiments (e.g., MMO embodiments), a player may use a gamepad or joypad, a mouse, a keyboard, and/or any other suitable user input device to select storage option 414.

Further, as a result of the fact that a game event may include anything that happens during wagering game 400, any data associated with a game event may also be stored in response to selection of storage option 414. For example, in the reel-based wagering game 400 of FIG. 4, the game event itself may include a winning symbol combination on reels 402-410, while data associated with the game event may include celebration graphic 412 and/or a game award provided to a player of wagering game 400 in conjunction with the winning symbol combination.

As described herein, in some embodiments, an image or video of the player may be recorded or captured by an image capture device, such as a camera of the player's EGM 104A-104X and/or a camera of the player's EUD 264. In some cases, another camera, such as a ceiling mounted casino camera, may also capture player reactions, such as, for example, in the case that the player's EGM 104A-104X does not include a camera.

As a result, and in various embodiments, in response to a game event, such as a winning game outcome, game controller 202 may control a camera to capture one or more images or videos of the player, whereby the player reaction to the occurrence of the game event (e.g., player excitement, player anticipation, player disappointment, etc.) may be captured and stored for replay and/or sharing later.

In some embodiments, after capture of the player reaction, game controller may provide or cause to be displayed a preview of the image or video data, which the player may be allowed to edit (e.g., to remove identifying information, etc.) prior to storage. For example, in at least some embodiments, a player may make changes to a recording, such as removing or cropping background images, adding voice over data of any type (e.g., an explanation, music, etc.) desired by the player, adding image filters, and the like. In some embodiments, a player may be able to select a clip of the recording to be stored. For example, a player may desire to only have 5 seconds of their reaction recorded, despite a preview displayed 30 seconds of their reaction. Accordingly, game controller may edit image and/or video data depending on feedback from a player. As an example, if a game event (e.g., reels spinning and stopping) is longer than a recording of a player reaction, the player reaction recording may be replayed more than once a stored video of a game event (e.g., a 5 second player reaction may be played 3 times during a game event video lasting 15 seconds). Further, in some embodiments, a player may be allowed to delete a copy of the recording and/or the copy of the game event itself. Players may find this option useful, for example, where they are dissatisfied with their reaction and/or simply to preserve privacy.

Likewise, game controller 202 may remove background data (e.g., images of other casino patrons, images of the player's surrounding environment, such as when the player is playing from home or another private location on an EUD 264, and the like) from the image data to preserve the privacy the player and/or others who may be proximate the player during the recording. In addition, as described herein, in some embodiments, players may select an option (e.g., from a loyalty account) to opt out of image or video capture, which may prevent capture of the player's reaction. In some embodiments, players may be required to opt in before images and/or videos are captured. In some embodiments, a player may turn off and/or on a recording feature of EGM 104A-104X as described herein. In some embodiments, game controller 202 may automatically obscure the faces, and/or other identifying features, of patrons other than the player of the game. In some embodiments, game controller 202 may eliminate all content (patrons, other EGMS, etc.) in the background of the image/video so that only the player can be seen (e.g., as if the player was in front of a green screen). In some embodiments, the player may be presented with options at EGM 104A-104X to select a particular background to be shown behind them in the picture/video. In these embodiments, a player may select a background from a number of default background options stored (e.g., at memory 208) and/or select/create a custom background (e.g., stored at EUD 264). The default options may include, as examples, images/videos of different locations at the casino where the player is playing and images/videos of landmarks near the casino where the player is playing.

Similarly, in an MMO that includes one or more wagering aspects, selection of storage option 414 may cause a game event that includes a victory occurring during the MMO and/or any other player-to-player interaction that players may wish to save to be stored. Data associated with such a game event may include any data necessary to recreate or replay the victory or player-to-player interaction, such as a map of the MMO, a video clip of the victory or player-to-player interaction, a leaderboard of players of the MMO, a game award provided to the victorious player or team, and the like.

Figure 5:
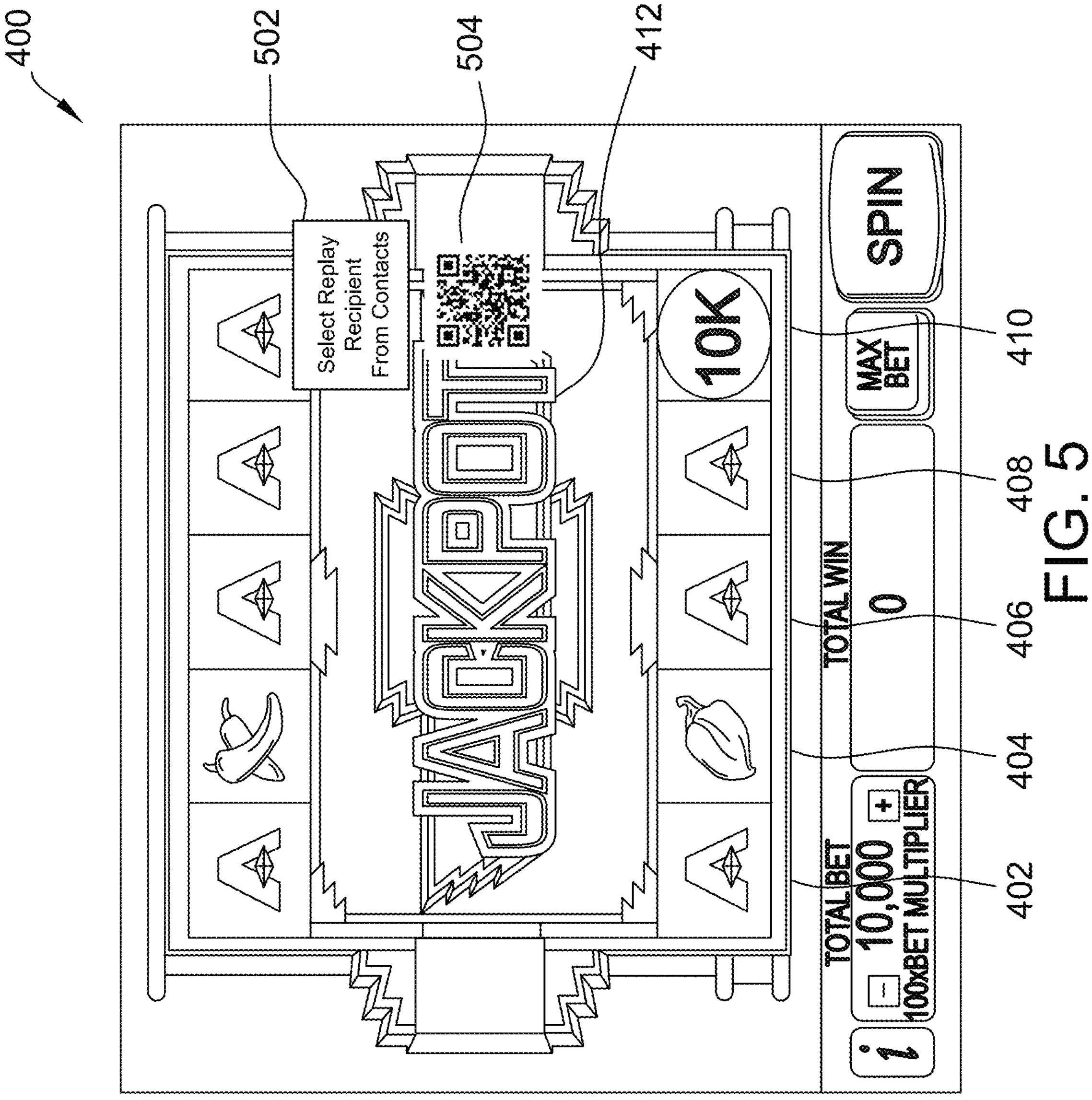
FIG. 5 is a screenshot of the wagering game of FIG. 4, in which the player provides or selects a replay recipient for the game event.

FIG. 5 is a screenshot of wagering game 400, in which the player provides or selects a replay recipient for a stored game event. Specifically, as shown, in response to selection of storage option 414 and/or in response to another player selection, such as a "share" option (not shown), a dialog box 502 (e.g., to "select replay recipient(s)") and/or another player input GUI may be provided or displayed. The player may select one or more replay recipients from the dialog box 502, such as another player (or players) or a social media page, as examples, with which to share a stored game event. Likewise, in at least some embodiments, a player may select replay recipients, such as one or more social media contacts with whom the player would like to share access to a stored game event. In another embodiment, a player may select a replay recipient including one or more contacts from the list of contacts stored in the player's EUD 264, and/or, more generally, any person, player, or entity designated by the player to receive the stored game event.

Frequently, embodiments in which a player selects one or more replay recipients from a list may be implemented on a player's EUD 264, such as embodiments related to online game play and/or play of the wagering game on the player's EUD 264. Likewise, in various embodiments, an encoded link or link may be provided, which a player may scan, such as using EUD 264. For example, a quick response (QR) code 504 may be displayed on a display device of an EGM 104A-104X. The player may scan the QR code 504 using EUD 264 to obtain a hyperlink to a recording of a game event. In various embodiments, the player may select the link from EUD 264 to view the recording. Further, as described in additional detail with reference to FIG. 6, other sharing and replay options may also be provided.

Further, in at least some embodiments, a player may be prompted to enter an email address or mobile telephone number and/or this information may be retrieved form a player account or loyalty account. Thereafter, a link to the game event and/or a copy of the replay event itself (e.g., a video file in any suitable format) may be texted, emailed, or otherwise provided to the player and/or any other replay recipient the player has specified. The player may, it will be appreciated, also forward the file to any desired individual after receipt.

In some embodiments, in order for a player to select storage option 414 and/or a share option (not shown), a certain eligibility criteria must be met by the player. For example, the eligibility criteria may be that the player be a member of a loyalty program. In some embodiments, a prompt may appear on a display of EGM 104A-104X and or EUD 264 notifying the player that they can access, store, and/or share a replay if they join a loyalty program. In some embodiments, the eligibility criteria may include acceptance of an agreement by the player that their image may be saved as part of the stored replay. It should be appreciated that a wide variety of eligibility criteria may be used by game controller 202 to determine whether a player is eligible to receive storage option 414 and/or a share option, as examples.

Figure 6:
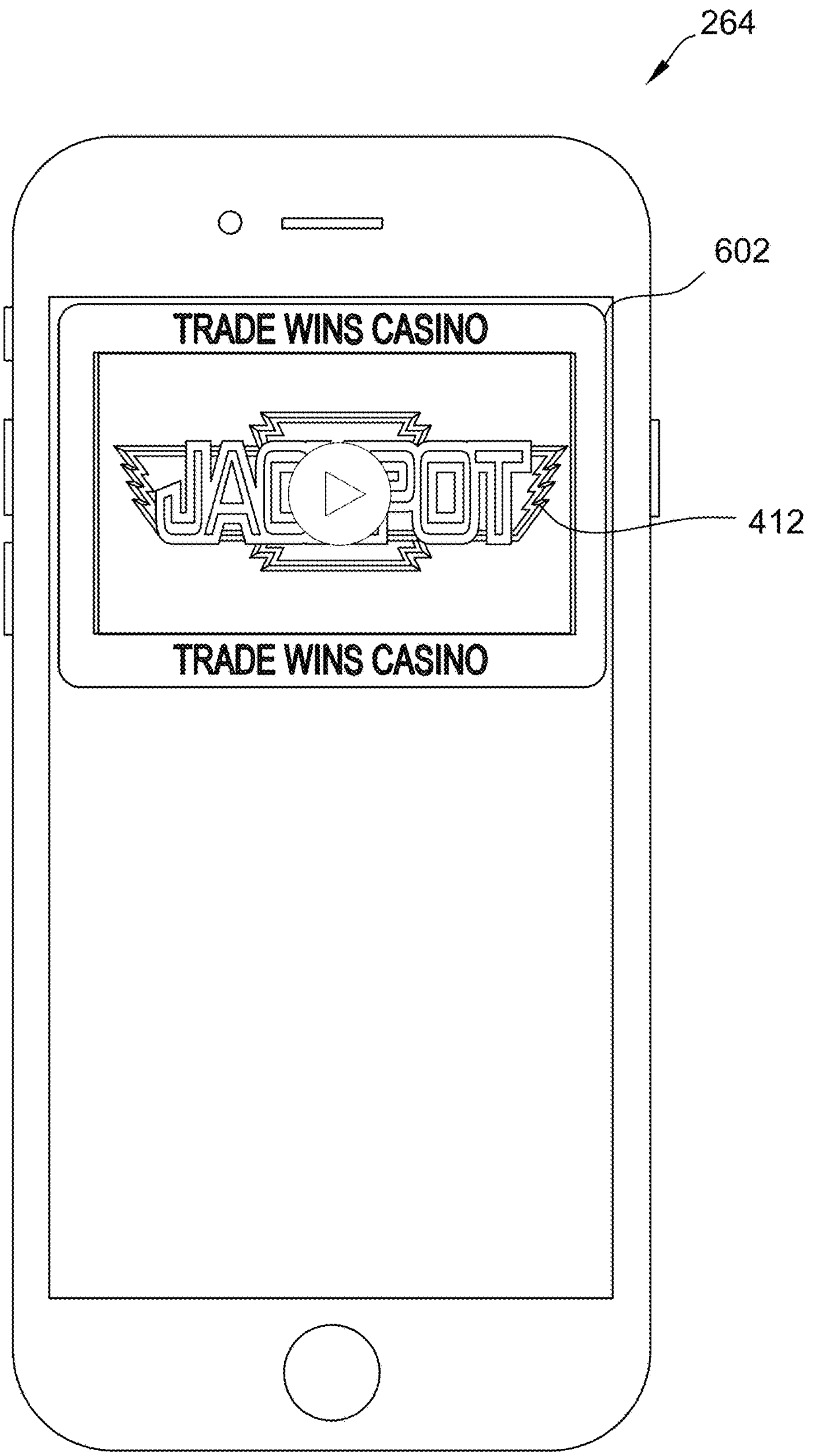
FIG. 6 is a schematic view of a mobile communication device, in which the mobile communication device is a replay recipient or operated by a replay recipient, and in which the mobile communication device receives and replays a game event.

FIG. 6 is a schematic view of EUD 264 of a replay recipient, in which the EUD 264 receives, and replays, a stored game event. As used herein, a stored game event may be "replayed" by displaying or recreating the stored game event, all or in part, for viewing by a replay recipient (or the player, as the case may be). That is, in at least some embodiments, the term "replay recipient" includes the player who generated the recorded game event. Likewise, replay recipients may include other individuals (e.g., contacts) specified by a player. As a result, players may view their own recorded game events, and contacts of players may view recorded game events.

In some embodiments, as described herein, a player reaction (e.g., as recorded by a camera) may also be provided to a replay recipient and replayed or displayed for the replay recipient on EUD 264. Specifically, a player reaction may be recorded automatically (if the player has opted in, as described herein) and linked to the game event. Later, when the player and/or other individuals view the game event, the player reaction may also be displayed in connection with the game event.

As a result, one technical improvement embodied by the present disclosure is that players can watch and re-watch any desired game event (e.g., winning, non-winning, and almost-winning, as described above). These game events may be viewed on any suitable electronic device, including any EGM 104A-104X, any EUD 264, and/or any other computing device with internet access to a social media platform. Players may thus share recordings of a variety of game events with others, which may generate excitement, interest in the game, etc. Players may also watch old recordings of game events, and these may, in at least one aspect, function as souvenirs of previous game events, such as previous jackpot awards, and the like.

Accordingly, in various embodiments, a stored game event may be replayed on an EGM 104A-104X (e.g., the player may designate himself as a replay recipient or simply select an option to "replay" a game event, such as a winning outcome). For example, in at least one embodiment, a player may select an option to "Replay the Win" (not shown) from his or her EGM 104A-104X, which may be different from the EGM 104A-104X on which the player achieved the game event, and which may cause the EGM 104A-104X to replay the winning outcome, including any celebration graphic and/or any other associated data, for review by the player.

Similarly, in at least some embodiments, a stored game event (and associated data) may be replayed on a device, such as EUD 264, of one or more designated or selected replay recipients. To illustrate, a player of wagering game 400 may obtain a winning outcome on an EGM 104A-104X. As described herein, the player may select one or more replay recipients, such as several family members, friends, and the like. These replay recipients may receive a link or notification to view the game event (e.g., the winning outcome) for replay on their respective EGMs 104A-104X, EUDs 264, etc.

Although EUDs 264 described as at least one means for receiving and sharing a game event, it will be appreciated that in other embodiments, any device capable of receiving a stored game event may be provided the game event for replay. For instance, in at least one embodiment, a player may select family members having associated player tracking accounts, and a backend server 106-114 may provide the game event to EGMs 104A-104X currently occupied or otherwise played by the family members specified by the player based upon the player tracking account information, which the backend system may use to identify the EGMs 104A-104X occupied by the player's family members.

In at least some embodiments, a replay recipient may designate one or more other replay recipients, and these subsequent replay recipients may also be provided a copy of the game event for replay and/or re-sharing. This replay and re-sharing process may theoretically continue indefinitely, thereby providing an opportunity for certain game events (e.g., particularly fantastic game events) to "go viral" (e.g., to be re-shared many thousands of times between many thousands of replay recipients, receive many thousands of views on a particular website, etc.).

Accordingly, as shown in the example of FIG. 6, a stored game event may be provided to EUD 264 of at least one replay recipient and replayed on a display of EUD 264. As described herein, a stored game event may be obtained by providing a link to the stored game event to the player or to a replay recipient. In at least one embodiment, a link may be encoded, such as by a QR code. Either the player or a replay recipient may select the link to view the stored game event. The player and replay recipients may also share or forward the link to other individuals to provide additional access to the game event.

As described herein, in various embodiments, stored game events may include screenshots of anything a player wishes to record as well as videos of sequences leading up to and following any game events players may wish to record and share. For example, in reel game, the spin or spins leading to a game event (e.g., a jackpot or another winning game event) may be stored and replayed, whereby replay recipients can view not only the still image (e.g., a photograph stored as an image file) of the winning celebration itself, but the build-up to the win, etc.

As a result, at least one technical improvement embodied by the present disclosure is that a replay recipient and/or the player may replay and view the stored game event, in detail, whereby all of the original excitement of the game event may be recreated and relived. Another technical improvement is that game events can be shared and re-shared multiple times (e.g., indefinitely). As a result, excitement for a game may be allowed to propagate, such as on a social media platform, through multiple iterations; in common parlance, replays may "go viral." Player status may also increase, particularly where a player shares multiple replay events over time (e.g., players may become famous on a variety of social media platforms for regularly achieving big wins, big losses, etc.) Likewise, in at least some embodiments, a number of views or replays of a particular game event may be tracked, and a relative position of the player on a leaderboard of players or another status chart may be adjusted based upon the number of replays associated with the replay event.

Furthermore, as described herein, game events may be stored in association with a variety of digital content, and the digital content may be displayed during a replay of a stored game event. For example, additional digital content may include a name of a casino with which a player achieved a winning outcome during wagering game 400. The name of the casino and any other desired advertising or marketing data may be displayed during replay of game events for advertising purposes, as an example. In the example of FIG. 6, the player has achieved a winning outcome of wagering game 400 in the "Trade Wins Casino." As a result, an digital content 602 including the name of the "Trade Wins Casino" is provided in association with the replay of the stored game event. As shown, in at least some embodiments, digital content 602 may include a banner, such as a border, that frames the game event, where the banner shows the name of the casino overlaid on at least a portion of the stored copy of the game event. Similarly, digital content 602 may include a watermark with the name of the casino and/or other marketing or promotional information overlaid on at least a portion of the stored copy of the game event. In other embodiments, any other advertising or promotional data may be provided.

In some embodiments, a player may be able to add different features/content to the stored copy of a game event (e.g., game event 702). For example, a player may desire to add additional content on to the beginning, middle, and/or end of the copy of the game event. As an example, a player may record a video as a preamble to the game event (e.g., a short introduction to introduce himself/herself to viewers) to be stored along with the copy of the game event. Additionally, a player may record a video to be inserted at the end of the video of the stored game event. For example, a player may desire to further describe their reaction shown in the video, and/or encourage viewers to watch other game events shared by the player (e.g., on a social media page of the player). Accordingly, in some embodiments a player may be able to edit the copy of the game event in any variety of ways (e.g., to add additional animations, commentary, etc.). For example, a player may be able to make a record audio data (e.g., a voiceover) that will be played in conjunction with a photograph and/or video when the game event is replayed. In some embodiments, a player may be unable to edit the copy of the game event stored at memory 208, for example, but may be able to edit a local copy at a player EUD (e.g., EUD 264*a*).

In some embodiments, a pre-recorded video may be added to copies of game events as described herein. For example, a casino and or game manufacturer may record a short to explain the game being played, promote the casino where the game is being played, promote the ability of certain EGMS 104A-104X to record player reactions, and much more. In these examples, a player may be able to select an option to add and/or remove the pre-recorded video. In some embodiments, a player may be required to keep the pre-recorded video in the stored copy of the game event.

Figure 7:
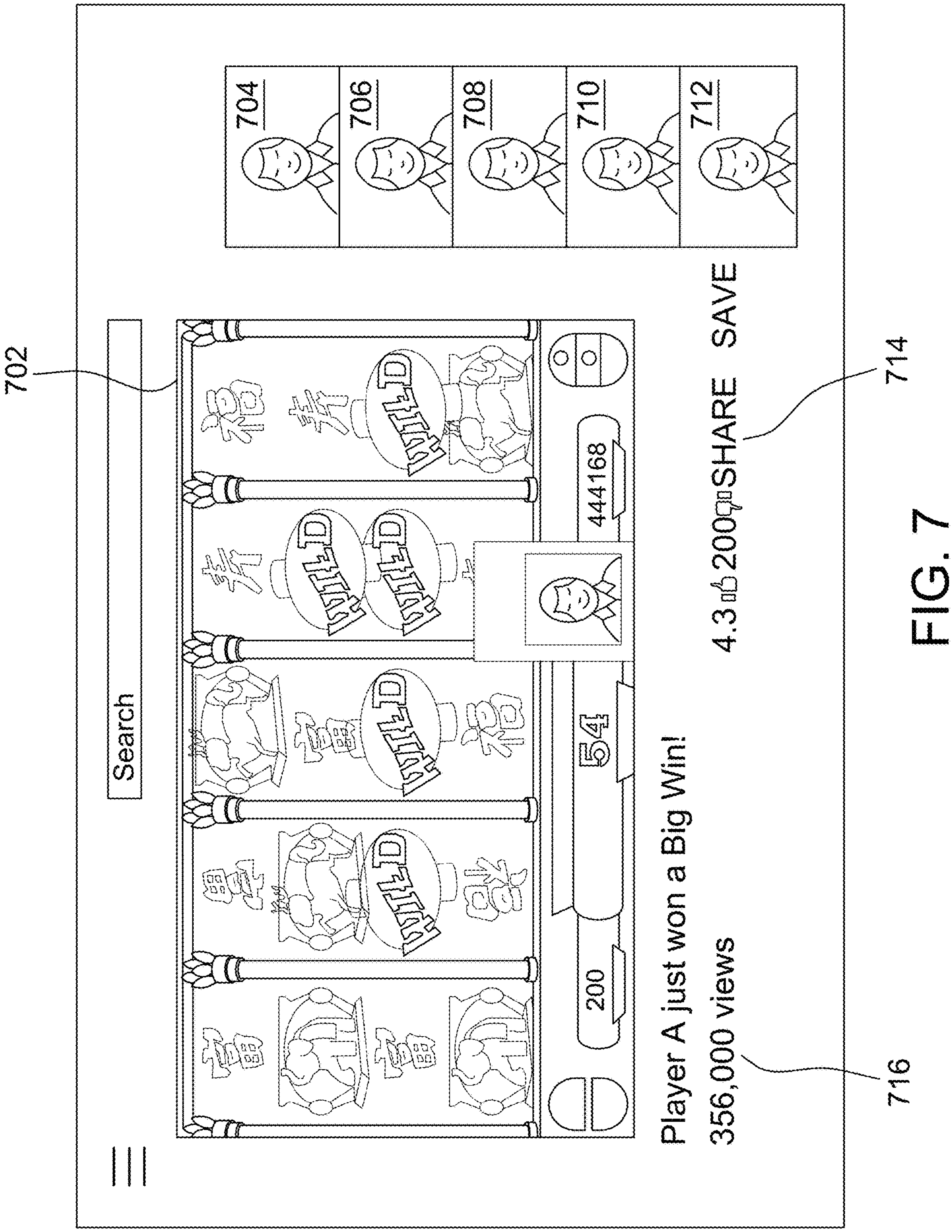
FIG. 7 is a screenshot of a social media platform that displays a stored game event for viewing by one or more replay recipients.

FIG. 7 is a screenshot of a social media platform that displays a copy of a game event 702 for viewing by one or more replay recipients, such as a first replay recipient 704, a second replay recipient 706, a third replay recipient 708, a fourth replay recipient 710, and a fifth replay recipient 712. Although five replay recipients 704-712 are shown, it will be appreciated that any number of replay recipients may receive access to the copy of the game event 702. Further, although icons associated with each replay recipient 704-712 are shown, in many embodiments, these icons may be omitted. In some embodiments, instead of replay recipients 704-712 being displayed, game events different from game event 702 may be displayed to encourage viewers to continue watching game events after viewing game event 702.

Accordingly, in the example embodiment, the copy of the game event 702 is displayed, such as on a social media platform and/or on any other website, and replay recipients may be provided access to the copy of the game event via the social media platform and/or website. Specifically, as described herein, replay recipients may be provided a link to the platform or website, such as by the player who achieved the game event (e.g., in a text message). Likewise, a "share" option 714 may permit replay recipients to share the game event with other replay recipients (not specified by the original player but by replay recipients themselves). Thus, as described above, a number of views (or replays) 716 may be maintained and incremented each time a game event is replayed. As a result, in at least some embodiments, a player's popularity and/or status my increase based on a number of replays the player's game event has recorded. Likewise, in some embodiments, players may be provided additional awards (e.g., bonus awards added to a player account) when they achieve threshold numbers of replays.

Figure 8:
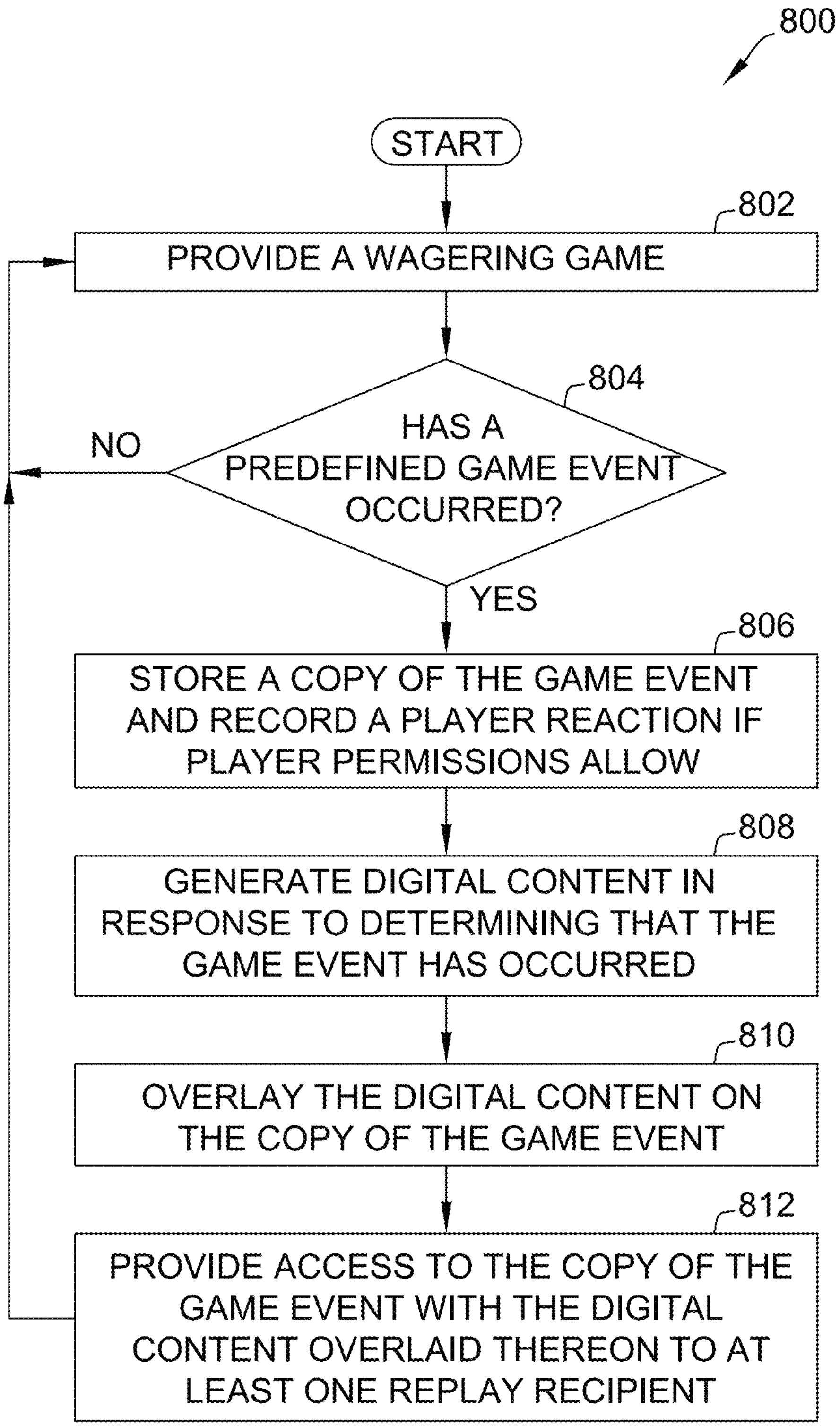
FIG. 8 is a flowchart illustrating a process for storing, sharing, and replaying a game event.

FIG. 8 is a flowchart illustrating a process 800 for storing, sharing, and replaying a game event. Accordingly, in various embodiments, a wagering game may be provided, such as in response to receiving a player wager (step 802). The player may play the wagering game, as those of skill in the gaming arts will generally appreciate, until a game event, as described herein, occurs (step 804). For example, a winning game event, such as a winning symbol combination, may occur on reels 402-410.

In response to the occurrence of the game event, a copy of the game event may be stored, as described in detail above. Further, if player permissions allow, a recording of the player's reaction to the occurrence of the game event (e.g., excitement) may be recorded and stored (step 806). In various embodiments, digital content may also be generated (step 808). Digital content may be related to the casino where the player is wagering and may include, for instance, the name of the casino and/or other information the casino deems appropriate. This data may be placed in border overlaid on a video or still copy of the game event, or it may be overlaid as a watermark over the video or still copy (step 810). The data may also be placed in similar relation to the video or still photograph of the player reaction.

Lastly, access to the copy of the game event and/or the copy of the player reaction may be provided to one or more replay recipients (step 812), and flow may return to step 802. As described herein, access to the copy of the game event and/or player reaction may be variously provided. For example, in some embodiments, a link may be provided, which the player and/or replay recipients can select to obtain access. Similarly, in some embodiments, a copy of the video and player reaction may be provided directly (e.g., emailed or texted). In addition, players and replay recipients may forward and share copies and links as desired to generate interest, excitement, friendly competition, and the like.

Embodiments of the present disclosure thus provide systems and methods for storing one or more game events, such as, for example, winning game outcomes, and providing the stored game events to one or more replay recipients, including the original player, for replay of the stored game events. In one example, a player may achieve a winning game outcome on a reel game, whereupon the winning game outcome may be stored for replay or subsequent watching as a game event (including a variety of associated data, such as digital content). The player may also designate or select one or more replay recipients (e.g., family members, social media contacts, etc.), who may receive a copy of (or a link to) the stored game event for replay on their electronic gaming machines, computing devices, smartphones, and the like.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system for playing a wagering game, the electronic gaming system comprising:

a display device;

a memory device; and a processor configured to execute instructions stored in the memory device, which when executed, cause the processor to at least:

retrieve a plurality of player recording options from a player account associated with a player;

provide the wagering game on the display device;

based upon a first player recording option of the plurality of player recording options, capture at least one digital image of the player;

determine whether a game event that satisfies a second player recording option of the plurality of player recording options at least one of i) has occurred during a play of the wagering game or ii) will occur during the play of the wagering game;

generate digital content including the at least one digital image;

overlay the digital content on a copy of the game event;

identify pre-recorded content associated with the wagering game;

include the pre-recorded content in the copy of the game event;

based upon the second player recording option being satisfied, store the copy of the game event including the pre-recorded content, the digital content, and at least one different play of the wagering game preceding the play of the wagering game in the memory device; and provide a local copy of the game event including the pre-recorded content, the digital content, and the at least one different play to at least one device associated with at least one replay recipient, wherein the pre-recorded content is un-editable in the local copy and wherein the digital content is editable in the local copy.

2. The electronic gaming system of claim 1, wherein the game event includes a winning game outcome, and wherein the instructions, when executed, further cause the processor to at least:

determine that the winning game outcome has occurred; and store a video copy of a reel spin preceding the winning game outcome and resulting in the winning game outcome as the copy of the game event.

3. The electronic gaming system of claim 1, wherein the game event includes an almost-winning game outcome, and wherein the instructions, when executed, further cause the processor to at least:

determine that the almost-winning game outcome has occurred; and store a video copy of a reel spin preceding the almost-winning game outcome and resulting in the almost-winning game outcome as the copy of the game event.

4. The electronic gaming system of claim 1, wherein the instructions, when executed, further cause the processor to at least:

record, as the at least one digital image, at least one of i) a photograph of a player and ii) a video of a player reaction of the player responding to the game event occurring; and store the photograph or the video in association with the copy of the game event, whereby, when the copy of the game event is provided to the at least one replay recipient, the photograph or the video of the player reaction is also provided to the at least one replay recipient.

5. The electronic gaming system of claim 4, wherein the instructions, when executed, further cause the processor to at least:

record the at least one photograph or video of the player reaction using at least one of i) a camera of an electronic gaming machine and ii) a camera of an end-user device (EUD), the EUD including at least one of a smartphone, a personal computer, or a tablet computing device.

6. The electronic gaming system of claim 4, wherein the instructions, when executed, further cause the processor to at least:

retrieve at least one game event threshold value from a loyalty account of the player prior to recording the player reaction; and if an award associated with the game event exceeds the at least one game event threshold value, at least one of i) store the copy of the game event, and ii) record the photograph or video of the player.

7. The electronic gaming system of claim 4, wherein the instructions, when executed, further cause the processor to at least:

provide an option to edit the photograph or the video of the player reaction, wherein the option includes at least one of i) an option to apply an image filter, and ii) an option to record audio data that will be played in conjunction with the photograph or video when the game event is replayed.

8. The electronic gaming system of claim 1, wherein the instructions, when executed, further cause the processor to at least:

in response to determining that the game event has occurred during the wagering game, display a player selectable option that enables a player to at least one of i) review the copy of the game event, and ii) cause the processor to store the copy of the game event in the memory device.

9. The electronic gaming system of claim 1, wherein the instructions, when executed, further cause the processor to at least:

in response to determining that the game event has occurred during the wagering game and storing the copy of the game event in the memory device, display a player selectable option that enables a player to enter at least one of i) an email address to be provided access to the copy of the game event, and ii) a telephone number to be provided access to the copy of the game event.

10. The electronic gaming system of claim 1, wherein the instructions, when executed, further cause the processor to at least:

in response to determining that the game event has occurred during the wagering game and storing the copy of the game event in the memory device, one of i) display an encoded link to the copy of the game event, and ii) link to a website that provides access to the copy of the game event.

11. The electronic gaming system of claim 10, wherein the encoded link is a quick response (QR) code that is scannable by an end-user device (EUD) of a player to obtain a hyperlink providing access to the copy of the game event.

12. The electronic gaming system of claim 1, wherein the instructions, when executed, further cause the processor to at least:

in response to determining that the game event has occurred during the wagering game and storing the copy of the game event in the memory device, display a player selectable option that enables a player to at least one of i) delete the copy of the game event from the memory device, and ii) delete a copy of an image file that records a player reaction to occurrence of the game event.

13. The electronic gaming system of claim 1, wherein the instructions, when executed, further cause the processor to at least:

add the digital content to the game event prior to providing access to the copy of the game event, wherein to add the digital content to the copy of the game event, the instructions cause the processor to create a border that includes the digital content around at least a portion of the copy of the game event.

14. The electronic gaming system of claim 1, wherein the instructions, when executed, further cause the processor to at least:

add the digital content to the game event prior to providing access to the copy of the game event, wherein adding the digital content to the copy of the game event, further includes the processor generating a watermark that covers at least a portion of the copy of the game event, wherein the watermark includes at least one of i) a name of the wagering game and ii) a name of a casino where the wagering game is being played.

15. The electronic gaming system of claim 1, wherein the instructions, when executed, further cause the processor to at least:

track a number of replays associated with the copy of the game event;

provide an indication of the number of replays to a player; and adjust a relative position of the player on a leaderboard of players based upon the number of replays associated with the copy of the game event.

16. The electronic gaming system of claim 1, wherein the instructions, when executed, further cause the processor to at least automatically remove background data from the at least one digital image to obscure a surrounding environment.

17. The electronic gaming system of claim 1, wherein the instructions, when executed, further cause the processor to at least store the copy of the game event such that the copy of the game event is un-editable by the replay recipient.

18. The electronic gaming system of claim 1, wherein the replay recipient is the player.

19. An electronic gaming device comprising:

at least one memory with instructions stored thereon; and at least one processor in communication with the at least one memory, wherein the instructions, when executed by the at least one processor, cause the at least one processor to:

retrieve a plurality of player recording options from a player account associated with a player;

provide an electronic game on a display device;

based upon a first player recording option of the plurality of player recording options, capture at least one digital image of the player;

determine whether a game event that satisfies a second player recording option of the plurality of player recording options at least one of i) has occurred during a play of the electronic game or ii) will occur during the play of the electronic game;

generate digital content including the at least one digital image;

overlay the digital content on a copy of the game event identify pre-recorded content associated with the electronic game;

include the pre-recorded content in the copy of the game event based upon the second player recording option being satisfied, store the copy of the game event including the pre-recorded content, the digital content, and at least one different play of the electronic game preceding the play of the electronic game in the at least one memory; and provide a local copy of the game event including the pre-recorded content, the digital content, and the at least one different play to at least one device associated with at least one replay recipient, wherein the pre-recorded content is un-editable in the local copy and wherein the digital content is editable in the local copy.

20. At least one non-transitory computer-readable storage medium with instructions stored thereon that, in response to execution by at least one processor, cause the at least one processor to:

retrieve a plurality of player recording options from a player account associated with a player;

provide an electronic game on a display device;

based upon a first player recording option of the plurality of player recording options, capture at least one digital image of the player;

determine whether a game event that satisfies a second player recording option of the plurality of player recording options at least one of i) has occurred during a play of the electronic game or ii) will occur during the play of the electronic game;

generate digital content including the at least one digital image;

overlay the digital content on a copy of the game event identify pre-recorded content associated with the electronic game;

include the pre-recorded content in the copy of the game event based upon the second player recording option being satisfied, store the copy of the game event including the pre-recorded content, the digital content, and at least one different play of the electronic game preceding the play of the electronic game in the at least one non-transitory computer-readable storage medium;

generate digital content including the at least one digital image;

overlay the digital content on the copy of the game event; and provide a local copy of the game event including the pre-recorded content, the digital content, and the at least one different play to at least one device associated with at least one replay recipient, wherein the pre-recorded content is un-editable in the local copy and wherein the digital content is editable in the local copy.

* * * * *